United States Patent
Archer et al.

(10) Patent No.: US 11,699,783 B2
(45) Date of Patent: Jul. 11, 2023

(54) PROTECTIVE LAYERS FOR METAL ELECTRODE BATTERIES

(71) Applicant: Cornell University, Ithaca, NY (US)

(72) Inventors: Lynden A. Archer, Ithaca, NY (US); Zhengyuan Tu, Nanchang (CN); Snehashis Choudhury, Ithaca, NY (US); Shuya Wei, Sanmenxia (CN); Qing Zhao, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 372 days.

(21) Appl. No.: 16/471,398

(22) PCT Filed: Dec. 19, 2017

(86) PCT No.: PCT/US2017/067358
§ 371 (c)(1),
(2) Date: Jun. 19, 2019

(87) PCT Pub. No.: WO2018/118952
PCT Pub. Date: Jun. 28, 2018

(65) Prior Publication Data
US 2020/0152975 A1    May 14, 2020

Related U.S. Application Data

(60) Provisional application No. 62/572,943, filed on Oct. 16, 2017, provisional application No. 62/556,037, (Continued)

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0426* (2013.01); *H01M 4/0435* (2013.01);
(Continued)

(58) Field of Classification Search
CPC combination set(s) only.
See application file for complete search history.

(56) References Cited

U.S. PATENT DOCUMENTS 6,371,995 B1 * 4/2002 Yasunami ......... H01M 10/0587
                                                    429/324
6,402,795 B1 * 6/2002 Chu .................... H01M 10/052
                                                    29/623.5
(Continued)

FOREIGN PATENT DOCUMENTS

| CN | 1415123 A | 4/2003 |
| CN | 103098293 A | 5/2013 |
| JP | S5686463 A | 7/1981 |

OTHER PUBLICATIONS

International Search Report and Written Opinion dated May 29, 2018 in PCT Application No. PCT/US2017/067358.
(Continued)

*Primary Examiner* — Ula C Ruddock
*Assistant Examiner* — Sarika Gupta
(74) *Attorney, Agent, or Firm* — Norton Rose Fulbright US LLP

(57) ABSTRACT

Hybrid electrodes for batteries are disclosed having a protective electrochemically active layer on a metal layer. Other hybrid electrodes include a silicon salt on a metal electrode. The protective layer can be formed directly from the reaction between the metal electrode and a metal salt in a pre-treatment solution and/or from a reaction of the metal salt added in an electrolyte so that the protective layer can be formed in situ during battery formation cycles.

20 Claims, 6 Drawing Sheets

Related U.S. Application Data filed on Sep. 8, 2017, provisional application No. 62/436,248, filed on Dec. 19, 2016.

(51) Int. Cl.

| | |
|---|---|
| *H01M 4/1395* | (2010.01) |
| *H01M 4/38* | (2006.01) |
| *H01M 4/46* | (2006.01) |
| *H01M 10/0525* | (2010.01) |
| *H01M 10/054* | (2010.01) |
| *H01M 10/44* | (2006.01) |
| *H01M 4/134* | (2010.01) |
| *H01M 4/62* | (2006.01) |
| *H01M 10/052* | (2010.01) |
| *H01M 10/0567* | (2010.01) |
| *H01M 4/02* | (2006.01) |

(52) U.S. Cl.
CPC ......... *H01M 4/0466* (2013.01); *H01M 4/134* (2013.01); *H01M 4/1395* (2013.01); *H01M 4/381* (2013.01); *H01M 4/382* (2013.01); *H01M 4/386* (2013.01); *H01M 4/387* (2013.01); *H01M 4/463* (2013.01); *H01M 4/466* (2013.01); *H01M 4/628* (2013.01); *H01M 10/052* (2013.01); *H01M 10/054* (2013.01); *H01M 10/0525* (2013.01); *H01M 10/0567* (2013.01); *H01M 10/44* (2013.01); *H01M 2004/021* (2013.01); *H01M 2004/027* (2013.01); *H01M 2300/0025* (2013.01); *H01M 2300/0051* (2013.01)

(56) References Cited

U.S. PATENT DOCUMENTS

| | | | |
|---|---|---|---|
| 2004/0096737 A1* | 5/2004 | Kim | H01M 10/0525 |
| | | | 429/231.95 |
| 2006/0019167 A1* | 1/2006 | Li | H01M 4/62 |
| | | | 429/233 |
| 2006/0240327 A1* | 10/2006 | Deng | H01M 10/4235 |
| | | | 429/231.95 |
| 2011/0104574 A1* | 5/2011 | Shembel | H01M 10/052 |
| | | | 429/313 |
| 2012/0183880 A1* | 7/2012 | Toussaint | H01M 4/70 |
| | | | 429/480 |
| 2013/0130124 A1* | 5/2013 | Fukunaga | H01M 4/661 |
| | | | 429/242 |
| 2014/0125292 A1* | 5/2014 | Best | H02J 7/00 |
| | | | 429/188 |
| 2014/0127575 A1* | 5/2014 | Scrosati | H01M 4/366 |
| | | | 429/213 |
| 2016/0336625 A1* | 11/2016 | Jeong | H01M 50/457 |

OTHER PUBLICATIONS

Schmuck, Martin, et al. "Alloying of electrodeposited silicon with lithium—a principal study of applicability as anode material for lithium ion batteries" Journal of Solid State Electrochemistry, vol. 14, No. 12, pp. 2203-2207, Dec. 20, 2008.

Veit, Claudia. "Improved and Novel Electrolytes for Lithium Metal and Lithium-Ion Batteries" Doctoral Thesis, TU-Graz, Jan. 1, 2012.

English Translation of CN1415123A, Published Apr. 30, 2003.

English Translation of CN103098293A, Published May 8, 2013.

\* cited by examiner

PROTECTIVE LAYERS FOR METAL ELECTRODE BATTERIES

CROSS-REFERENCE OF RELATED APPLICATIONS

This application is the U.S. National Phase under 35 U.S.C. § 371 of International Patent Application No. PCT/US2017/067358, filed on Dec. 19, 2017, which in turn claims the benefit of U.S. Provisional Application Nos. 62/436,248, filed 19 Dec. 2016, 62/556,037 filed 8 Sep. 2017, and 62/572,943, filed 16 Oct. 2017, the entire disclosures of which are hereby incorporated by reference herein.

STATEMENT REGARDING FEDERALLY SPONSORED RESEARCH

This invention was made with government support under grant numbers DMR-1609125 and DMR-1120296 awarded by the National Science Foundation and grant numbers DE-AR0000750 and E-FOA-001002-2265 awarded by the Department of Energy. The government has certain rights in the invention.

TECHNICAL FIELD

The present disclosure relates to protective layers for metal electrode batteries, methods of making the protective layers, and batteries comprising the protective layers.

BACKGROUND

High energy rechargeable batteries based on active metal (Li, Na, Al, Si, Sn, Zn, etc.) anodes are among the most important electrochemical energy storage devices to supply power for rapidly evolving technologies, including the fields of portable electronics, advanced robotics, electrification of transportation, etc. It has long been understood that such metal based anodes offer factors of 2-10 times higher specific capacity (e.g., 3860 mAh/g for Li), compared with the carbonaceous anode (360 mAh/g) used in lithium ion battery technology. Some metal anode batteries are also advantageous because they enable the development of high-energy unlithiated materials, such as sulfur, oxygen, and carbon dioxide as the active species in the cathode. This raises the prospect of multiple battery platforms that offer large improvements in specific energy on either a volumetric or mass basis.

Despite their promise, rechargeable batteries based on lithium (Li) metal, sodium (Na) metal, and aluminum (Al) anodes are not commercially viable today because the metals are plagued by one or more instabilities. Chemical instability of the metal in contact with liquid and solid-state ceramic electrolyte depletes the electrolyte and electrode overtime, leading to run-away increases in cell resistance. At low current densities, spatial heterogeneities in the conductivity of spontaneously formed, fragile solid electrolyte interphases (SEIs) on Li lead to rough plating of the metal during battery recharge as electric field lines concentrate on thinner, more conductive SEI that provide faster growth leading to the morphological instability typically associated with mossy, high-surface-area deposits. At high current densities, depletion of ions from an electrochemically active surface leads to formation of the hydrodynamic instability termed electroconvection, which drives selective metal deposition at localized regions on the electrode to form diffusion limited fractal structures termed dendrites. Because the driving force for the last of these three instabilities is physical, all batteries based on charge storage by reduction of metal ions at the anode (e.g. Li, Na, Al) will fail by this mechanism at high currents.

Uncontrolled growth of metallic structures created as a result of morphological or hydrodynamic instabilities leads to battery failure by formation of internal shorts, which limits the cell lifetime. Even if this failure mode can be prevented through choice of electrolyte additives the chemical and physical fragility of the formed structures cause cell failure by other means, typically loss of active material in the anode, which manifests as a low charge utilization or Coulombic efficiency. Additionally, because Li-ion cells based on high-energy metallic anodes including Si, Sn, and Ge store Li by alloying reactions, which produce large cyclic volume change in the electrode and destroys the SEI formed on the electrode each cycle, the first of the three instabilities are common to Li-ion batteries based on any of these chemistries.

The main hurdles preventing large-scale deployment of batteries based on metal anodes stem from the uneven electrodeposition of metal ions during battery recharge and parasitic reactions between the metal anode and liquid electrolytes during all stages of battery operation. For example, batteries based on lithium or sodium are well-known to form rough, dendritic structures upon being reduced as a result of their intrinsic tendency to deposit on protrusions where the electric field lines are concentrated. Accumulated dendritic deposits can connect two electrodes, causing short-circuit and other safety-related hazards. In less extreme cases, dendrites promote the parasitic reaction of metal and the electrolyte which lowers the Coulombic efficiency and deteriorates the battery performance over time. This can be a more severe problem in a capacity balanced 'full cell' in which very limited amount of the metal species are present, in contrast with lab-based 'half-cell' where usually excessive metal anodes are used.

It has been previously demonstrated that, elements such as Si, Sn, In, Mg, and Ge are able to reversibly form alloys with lithium (e.g., $Li_{4.4}Sn$), meaning these materials provide certain capacity in rechargeable lithium metal batteries. However, when used as stand-anode anodes, Si, Sn, In, Mg, and Ge undergo large volume changes (as high as 300%) upon lithiation, which destroys electrical connection with the current collectors and causes premature battery failure. The effects are even more severe for batteries based on sodium. This problem was previously addressed by two methods: creating composite anodes in which the metal is integrated with an inert metal of conductive carbon (e.g. graphene, graphite, carbon black, carbon nanotubes), or by fabricating the active materials (e.g. Si, Sn, In, Mg, Ge) nanostructures in various morphologies (e.g., nanowires, nanotubes, hollow particles) able to accommodate the volume expansion. The first method inevitably lowers the specific capacity as the inert metal or carbon materials used in the composites only serve as mechanical reinforcement for the active Si, Sn, In, Mg or Ge material and does not participate in the electrochemical reaction. Additionally, the alloying process is typically slow, and ideally requires higher temperature than those normally used in batteries for long-term stability. Fabricating the active material in the form of nanostructures does extend the anode lifetime, but comes at considerable costs in terms of the lower density of the active material, which reduces the specific energy on a volume basis of the electrode. The added costs of the processes required to create nanostructures in the desired shapes at scale and with high degrees of reproducibility for battery manufacturing also introduce new challenges that have so far proven to be stubborn roadblocks to commercialization of batteries employing metals as anodes.

Hence, there is a continuing need to develop high energy rechargeable batteries based on active metal anodes.

SUMMARY OF THE DISCLOSURE

An advantage of the present disclosure is a hybrid electrode for a battery such as a rechargeable battery. The hybrid electrode can be a metal electrode, e.g., an anode of the battery, and the battery can further include cathode and an electrolyte. The hybrid electrode includes more than one layer and can allow for fast transport of ions at both the interface formed with an electrolyte and with the metal electrode. The hybrid electrode of the present disclosure further can be advantageously formed at approximately room temperature (e.g., 20° C. or less) or at the operating temperature of the battery.

These and other advantages are satisfied, at least in part, by a rechargeable battery comprising a hybrid electrode, wherein the hybrid electrode includes an electrochemically active metal or metal salt protective layer directly on an electrochemically active metal electrode. The electrochemically active metal protective layer can comprise an electrochemically active metal selected among Sn, In, Si, Al, Mg, or Ge, for example; and the electrochemically active metal salt protective layer can comprise an electrochemically active metal salt of Sn, In, Si, Al, Mg, or Ge, for example. The electrochemically active metal electrode can comprise comprises substantially metallic lithium, metallic sodium, metallic aluminum, metallic zinc, metallic silicon, or metallic tin, for example. Advantageously, the electrochemically active metal or metal salt protective layer can maintain conformal contact with the metal electrode during charge-discharge cycles.

Another aspect of the present disclosure includes methods for preparing the hybrid electrodes. Such methods include forming a protective layer on a metal electrode wherein the protective layer is electrochemically active such as by ion-exchange of a metal salt, e.g., a tin or indium metal salt, onto the metal electrode. The protective layer can be formed directly from a reaction between the metal electrode and the metal salt in a pre-treatment solution and/or when the metal salt is included in a liquid electrolyte such as including a tin or indium metal salt at about 1 mM to about 10 mM in a liquid electrolyte. Advantageously the protective layer can be formed at approximately room temperature (e.g., 20° C. or less) or at the operating temperature of the battery.

Another aspect of the present disclosure includes a rechargeable battery comprising a hybrid electrode, wherein the hybrid electrode includes a silicon salt, e.g., silicon chloride, on a metal layer, e.g., a substantially metallic lithium layer, of the electrode. Such a hybrid electrode can be formed by combining a solution containing the silicon salt with the metal layer in a pre-treatment step or by including the silicon salt to an electrode of the battery. The amount of the silicon salt in the treatment solution or electrolyte can be low, e.g., less than 1.0 M such as less than about 0.5 M.

Embodiments of the present disclosure include one or more of the following features individually or combined. For example, in some embodiments the metal salts comprise a halogen, e.g., F, Cl, Br, I, a phosphate sale such as or a such as $PF_6$, a bis(trifluoromethanesulfonyl) imide (TFSI) of tin, indium, silicon, aluminum, magnesium or germanium. In other embodiments the protective layer has a thickness in the range of about 5 nm to about 500 microns. In still further embodiments, the protective layer can be formed by any one or more of the following: laminating an alloy layer directly on a metal anode; mechanically pressing, physically rolling or pressing from a dummy electrode, an alloy layer directly on a metal anode; depositing, sputtering or vapor depositing, an alloy layer directly on a metal anode; or coating, as spin coating an alloy layer directly on a metal anode. In further embodiments, the protective layer can be formed without heating or an annealing step and/or without extra diffusion steps. The protective layer can be formed at room temperature and/or in situ in other embodiments or, in some embodiments, the electrochemically active protective layer can be formed in temperature range between about 1 to about 49° C. or between about 1 to about 10° C., between about 10-20° C., 20-30° C., 30-40° C., 40-50° C. or any subrange thereof. In still further embodiments, the protective layer and or metallic layer does not include a binder, and/or is substantially free of compounds or elements of C, N, and/or S.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Figure 1:
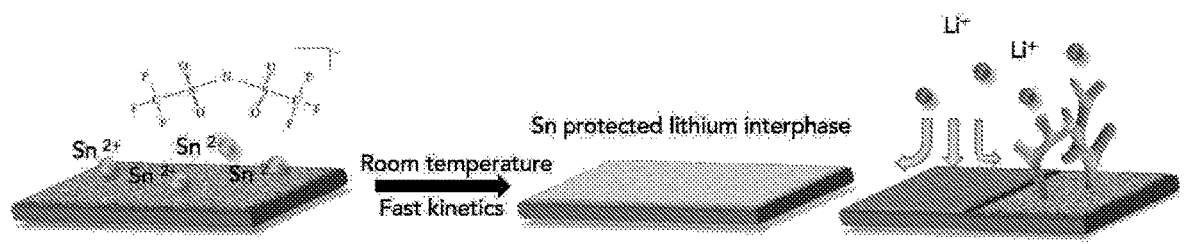
FIG. 1 illustrates a hybrid anode based on facile and fast Sn deposition on reactive metals produced by ion exchange with a metal salt, in accordance with an embodiment of the present disclosure.

In the following description, reference is made to the accompanying drawings that form a part hereof, and in which is shown by way of illustration specific embodiments which may be practiced. These embodiments are described in sufficient detail to enable those skilled in the art to practice the disclosure, and it is to be understood that other embodiments may be utilized and that structural, logical, and/or other changes may be made without departing from the scope of the present disclosure. The following description of example embodiments is, therefore, not to be taken in a limited sense.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present disclosure provides protective layers for metal electrodes for devices such as rechargeable batteries. Examples of metal electrode batteries are known in the art. Examples of metal electrode batteries having a protective layer of the present disclosure include, but are not limited to, lithium-air batteries, ion-conducting batteries, sodium-sulfur batteries, metal anode/intercalating cathode batteries, and the like.

Such rechargeable batteries can include an anode, separator, electrolyte (which can include one or more additives), and cathode. A battery can comprise various separator materials. Non-limiting examples of separator materials (e.g., separators) include polymer or ceramic porous membranes (e.g., polyethylene, polypropylene based porous membranes, glass fiber membranes, polymers that can be swollen by the electrolyte, etc.). A device can comprise one or more battery (e.g., metal electrode battery) having a protective layer of the present disclosure disposed on the metal anode of the battery. Examples of devices include, but are not limited to, portable electronics such as, for example, cell phones, laptops, tablets, electric vehicles powered by batteries, advanced airplanes and robotics, stationary energy storage units, which can be used for the grid.

The present disclosure also provides methods of making protective layers for the electrodes of batteries, and devices comprising same. The methods disclosed herein can be readily incorporated into large-scale manufacturing.

In an example, a protective layer is disposed on metal electrodes (e.g., lithium, sodium, aluminum, zinc, etc.) where the protective layer itself is also electrochemically active. By "electrochemically active" it is meant that the protective layer can also reversibly accommodate ions in either intercalation and/or alloy formation, or conversion manner, in addition to the energy storage mechanism from the metal electrodes. Such an electrode can be referred to as a hybrid electrode. It is expected that such hybrid energy storage model will improve battery energy density, lifetime, and efficiency.

In an example, the protective layer is a thin film comprising one or more metals. The protective layer can be an elemental metal or metal alloy with a reactive metal (e.g., Li, Na, Si, Sn, Al, Zn etc.). The thin film can have various thicknesses. In various examples, the thin film has a thickness of 20 nm to >10 µm (e.g., 10 µm). In an example, the interfacial impedance of the thin film is less than or equal to the unprotected reactive metal anode (e.g., lithium, usually <200 ohm cm$^2$). It is desirable that the thin film does not dissolve or react in the electrolyte.

In an aspect, the present disclosure provides methods of making protective layers of metal electrodes in situ (e.g., by reaction of an electrode surface with protective layer precursor materials in the electrolyte of a battery) or ex situ.

The present disclosure describes lithium or sodium metal anodes as examples in some cases, but the present disclose can be implemented on other electrochemically active metal electrodes such as, for example, Al, Zn, etc.

In one aspect of the present disclosure, a hybrid electrode is composed of a metal that reversibly stores charge by alloying reactions directly on a metal that utilizes plating processes for charge storage. By the processes of the present disclosure, it is possible to create hybrid anodes that utilize both storage mechanisms to overcome the most serious challenges with both sodium and lithium electrodes. In particular we report that a facile ion exchange chemistry performed in a conventional carbonate electrolyte can be used to rapidly deposit conformal coatings of components such as tin, indium, silicon, etc. and aluminum, magnesium, zinc, cadmium, etc. onto a metal anode electrode such as sodium or lithium electrodes. By controlling the thickness of these coatings to nanometer dimensions, we further show that they are able to perform multiple beneficial functions, including protecting the underlying metal electrode against parasitic reactions with liquid electrolytes, providing a compliant interphase that is able to accommodate volume changes associated with both the alloying and plating processes at the electrode, and suppressing dendrite formation at a Li or Na metal anode. The resultant hybrid mode, e.g., a hybrid lithium-metal/lithium-ion energy storage mode, achieved in cells where the alloying and plating reactions occur at similar potentials also facilitates fast, unhindered ion transport across the interphase. We find that the hybrid anodes of the present disclosure enable high-capacity, dendrite-free long-term battery cycling in both symmetric cells and full cells with high loading LiNiCoAlO (NCA) electrodes. The approach is particularly useful for sodium electrodes, notorious for their reactivity and propensity to form large, fragile dendritic deposits that easily break and become electrically disconnected from the electrode mass even at low current rates. It is observed that hybrid Sn/Na electrodes cycle stably for over 1000 hours in normally reactive carbonate-based liquid electrolytes.

A successful SEI for a reactive metal anode must have several properties. First, it must maintain conformal contact with the metal to prevent reductive decomposition of the electrolyte, and such contact needs to be maintained when metal anodes undergo volume expansion during multiple charge-discharge cycles. Second, it should facilitate fast transport of ions at both the interface formed with the liquid electrolyte and with the metal anode. Third, it must remain mechanically and electrochemically stable in a dynamic environment during extensive cycling. The results reported in this study build on recent progress addressing electrolyte consumption and dendritic electrodeposition at reactive metal anodes. Previous studies have shown that a broad range of materials, including crosslinked polymers, ceramic conductors, and hybrid composites prevent dendrite proliferation by fundamentally slowing the deposition kinetics at rough regions on an electrode. An equally important body of work has emerged, which shows that carefully tuning ion transport in liquid electrolytes can provide an effective method for suppressing electroconvective instabilities that accelerate dendrite growth at currents above the limiting current. For example, the application of various single-ion conductors have been shown to be effective at suppressing rough electrodeposition and minimizing ionic polarization. For related reasons, the use of supporting electrolytes, such as ionic liquids, has also emerged as an effective way of preventing dendrite proliferation at Li and Na electrodes.

SEI additives, such as vinylene carbonate, fluorinated ethylene carbonate, and others that breakdown prior to natural SEI precursors to build interphases with preferable electrochemical stability and mechanical robustness have also emerged as effective in promoting SEI layers with desired mechanical and transport properties. Artificial SEI composed of polymers, inorganic conductive compounds, nanoparticles, thin film, carbon materials, etc., produced either in-situ or ex situ on reactive metal electrodes have also been reported to isolate the electrodes from parasitic side reactions with unstable anions or solvent components in liquid electrolytes. The success of such coatings has in turn lead to adaptation of methods such as Langmuir-Blodgett, vapor deposition, and mechanical transfer of preformed coatings onto electrodes such as physically stamping, rolling, or calendaring the coating on the desired electrodes.

The hybrid anodes according to this embodiment may be prepared by a simple surface ion-exchange reaction in a commonly used aprotic liquid lithium electrolyte, 1M $LiPF_6$ in a carbonate-based liquid electrolyte, e.g., ethylene carbonate-dimethyl carbonate (EC:DMC) solvent blend, including a metal salt (tin bis(trifluoromethanesulfonyl) imide) (see FIG. 1). For this first study, we focus on Sn because much is known about the electrochemical behavior of the metal and its oxides, including the fast interdiffusion of Li in Sn and the <500 mV separation between electrochemical alloy formation and Li plating. The treatment process is also fast and spontaneous due to the large electronegativity difference between alkali metals and metallic tin. Depending on the concentration of Sn salt employed, the appearance of the lithium surface after the treatment ranges from dark brown to dark gray in color. The surface and the cross-sectional morphology of tin-protected lithium can be obtained without surface contamination using a cryo-FIB-SEM (also see experimental section). Such technique can show a cross-sectional image captured at −165° C. of Sn—Li created using a 10 mM tin salt in the electrolyte, in which a clearly tri-layer structure can be observed. The top layer is the frozen electrolyte used for the treatment, followed by a tin-rich layer with thickness on the order of 500 nm that is seen to be composed of nanoparticles with average size around 200 nm. EDX mapping confirms Sn is present in the nanoparticles of the protection layer. Note that no Sn signal is observed in the electrolyte region, which testifies to the fast and thorough interfacial reaction used to create the Sn overlayer. The bird's eye view of the Sn—Li hybrid anode without electrolyte by room-temperature SEM reveals a uniform distribution of Sn nanoparticles on the surface of Li, a morphology quite distinctive from the pristine lithium.

To confirm the structure and chemistry of the Sn—Li hybrid electrode surface, an X-ray diffractometer (XRD) is employed to understand the crystal structure and phase information. The XRD spectra of lithium metal with its surface treated with electrolytes containing 1, 10 and 100 mM Sn salt were obtained. At the lowest concentration, only lithium metal signals and a minor lithium oxide profile are observed, which indicates the reaction is inhibited likely due to the low activity of Sn ions. Peaks at 31.1, 32.4, 44.1 and 45.2 degrees start to appear when the concentration is increased to 10 mM, suggesting metallic tin with structure following the R3m space group is formed. Increasing the tin salt concentration to 100 mM, the metallic Sn layer alloys with Li, evidenced by peaks labeled with asterisks which correspond to a $Li_5Sn_2$ phase. The Sn overlayer generated from the high concentration (10 mM) electrolyte exhibits an increased thickness to about 2 μm with a compact, solid-like structure. The surface morphology is glassy in appearance with grain gaps among alloy terraces, possibly due to the formation of zintl phase that is naturally ionic and brittle. Because of their more uniform morphologies, electrochemical properties of Sn—Li hybrid anodes created using the 10 mM electrolyte are evaluated in detail. Of particular interest in such studies is the fact that because both the Sn and Li components in such electrodes are able to reversibly store Li by alloying and plating processes, respectively, lithium batteries that rely on mixed storage mechanisms are possible.

Knowledge of the charge transport processes at Sn-based electrode/electrolyte interphase can be deduced from impedance spectroscopy. An experiment was performed comparing the temperature-dependent Nyquist plots of symmetric cells equipped with the Sn—Li electrodes and the pristine lithium in a commonly used EC:DMC electrolyte. Each spectrum can be fitted into the equivalent circuit model to decouple the interfacial transport resistance from other processes. As expected, the interfacial resistance decreases with increasing temperature. The change as a function of temperatures follows a quasi-Arrhenius form in the intermediate temperature region which approximately indicates the interfacial transport being a thermally activated procedure. Only one semicircle appears in the spectra which indicate that the tin protection introduces no additional interfacial transport resistance.

Figure 2:
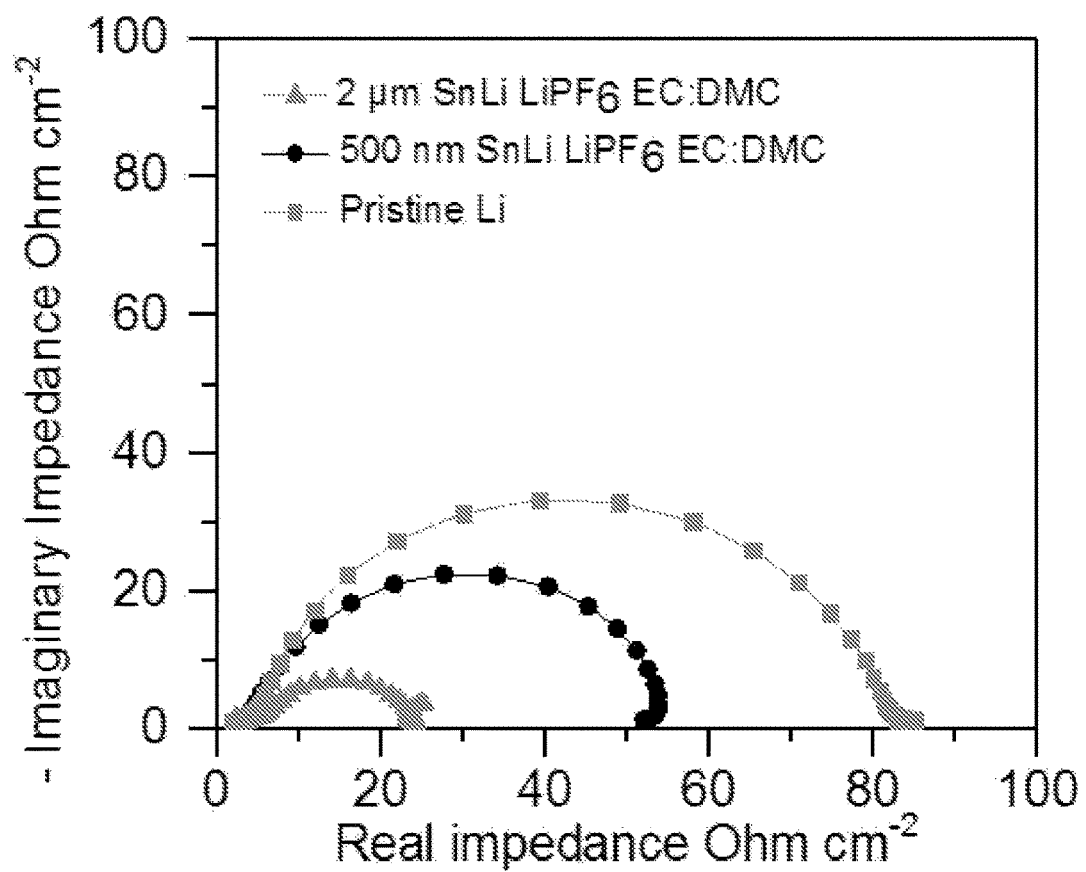
FIG. 2 is a plot comparing impedance spectra of symmetric lithium cells with tin-protected lithium and pristine lithium at room temperature.

In fact, the interfacial resistance of cells using Sn—Li anodes is gradually lowered with increasing concentration of tin-bearing electrolyte compared with that of the pristine lithium, as presented in FIG. 2. A nearly threefold decrease (from approximately 80 Ohm cm-2 (pristine) to 25 Ohm cm-2 (2 μm tin protection)) of the interfacial resistance is observed. This result demonstrates that ion transport through the Sn SEI is unhindered and perhaps even promoted, which we suspect comes from fast charge transfer kinetics at the Sn/Li interface. In particular, it is well known that because of its reactivity with oxygen, lithium metal foil usually forms an insulating oxidized layer on its surface even when stored in an argon filled glovebox. By treating the lithium with tin-bearing electrolyte, the oxidized layer is replaced by electrochemically active Sn nanostructures, which significantly facilitate ion transport through the SEI. Evidence in support of this point was prepared where the interfacial impedance of Sn—Li anodes exposed to air is reported as a function of time. It is clearly seen that the Sn overlayer leads to enhanced chemical stability of the interface, which would enable integration of such electrodes in conventional dry-room manufacturing processes. The temperature-dependent ionic conductivity of electrolytes in contact with the Sn—Li anodes is reported for various Sn coating thicknesses. The conductivity is seen to exhibit a Vogel-Fulcher-Tamman (VFT) temperature dependence in all cases and cells based on the 500 nm Sn layer exhibit the highest ionic conductivity (1.3 mS cm-1 at room temperature) compared with the pristine Li and Sn—Li with thicker Sn layer. This indicates that there is possibly an optimal coating thickness for achieving optimal electrochemical properties.

To further understand the electrochemical features of a Sn—Li anode, symmetric cells composed of a pristine Li electrode and a Sn—Li working electrode were evaluated using cyclic voltammetry. A broad peak near 100 mV corresponding to tin lithiation/delithiation has been observed during multiples cycles in addition to the typical Li/Li+ polarization curves, which corroborates the understanding that the Sn layer on Li is electrochemically active along with lithium plating/stripping. XPS analysis on the cycled Sn—Li anode reveals a SEI composed of typical materials including lithium carbonate, lithium alcohonate, and fluorinated species. High-resolution scanning in the Sn 3d region shows completely attenuated peaks due to a SEI formed during the surface treatment. These peaks become more pronounced and only slightly attenuated after multiple cycles, which testifies to the stable lithium-tin interaction without obvious SEI buildup, a result in agreement with the previous study. Cyclic voltammogram of Li/Li cell and Li/Sn—Li cells were compared and showed a drastic slope difference. The drastic slope difference is the most significant feature. Fitting the small overpotential region of the curve to Tafel equation the exchange current density can be obtained. The results show that the exchange current (7.5 mA cm-2) for the Sn—Li anode is substantially higher than the corresponding value for Li/Li+ on pristine lithium. The fast charge transfer kinetics obtained from the exchange current density reinforces our conclusions from the impedance results that the Sn-rich SEI on lithium facilitates faster charge transfer at the electrode.

In addition to the desired electrochemical properties, a suitable artificial SEI on lithium is expected to suppress dendrite proliferation, especially during long-term battery operation. Lithium electrodeposition at a Sn—Li electrode was visualized using a custom-built optical cell that fits in the stage of an up-right optical microscope (Nikon Optiphot) equipped with extra-long working distance objectives. For these experiments, Sn coatings were applied on two cylinder-shape lithium surfaces, which are connected to the battery tester by stainless steel transmission wires. Real-time images of the electrolyte/Sn interface can be captured at all stages of electrodeposition using the optical microscope.

Figure 3A:
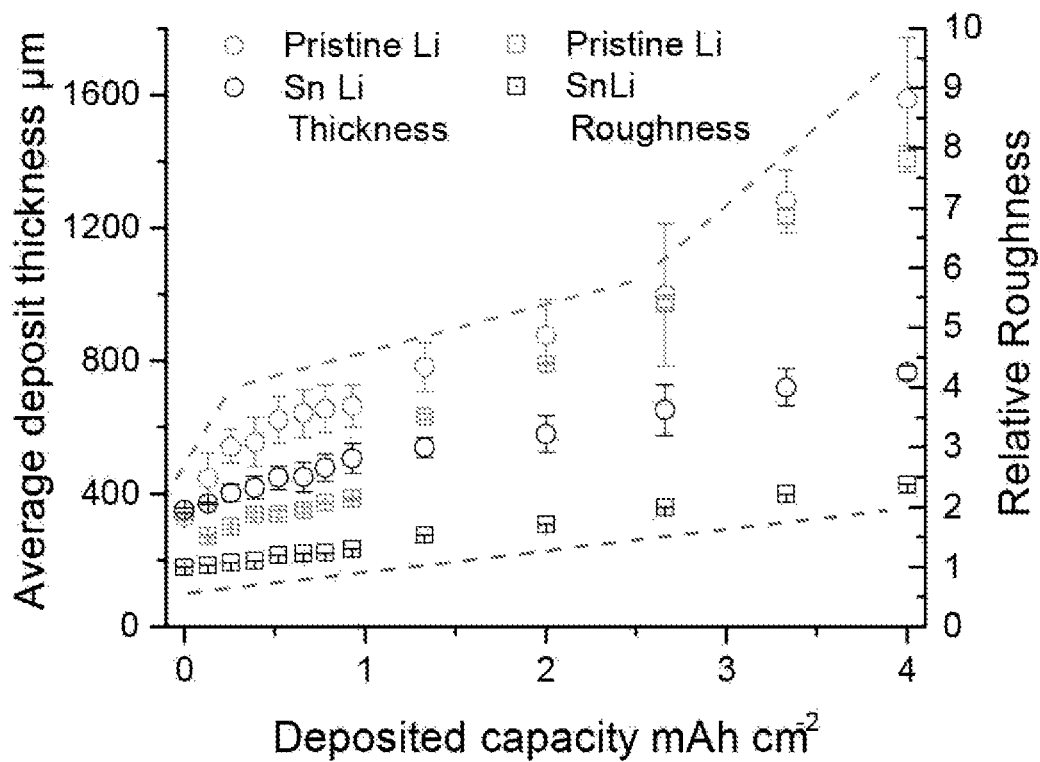
FIG. 3A shows quantitative analysis of average deposition thickness and relative roughness during electrodeposition on Sn—Li and pristine lithium electrodes at a current density of 4 mA cm$^2$.

From the evolution of the interface profile at a current density of 4 mA cm$^{-2}$. It is seen that the electrode substrate has a smooth morphology and is essentially dendrite-free, with a visually slower growth rate compared with the pristine lithium. Semiquantitative analysis can be performed on images using ImageJ software to obtain deposition thickness and roughness (here defined as the area ratio between the measurement and the theoretical value) as a function of capacity, as presented in FIG. 3A. Drastic morphology and roughness differences are apparent during the initial deposition of 0.5-1 mAh cm$^{-2}$, a capacity roughly equivalent to the lithium ion capacity of the tin coating. Electrodeposition of more lithium on the Sn—Li electrode is seen to produce a slightly rougher surface morphology, which is within expectations considering the above diffusion limiting current applied. The overall roughness is the Sn—Li electrodes are nonetheless remarkably reduced relative to the rapid and uncontrollable mossy deposits observed for a pristine Li electrode. These results further imply the electrochemically active Sn overlayer on the Li electrode is able to stabilize electrodeposition of Li likely by alloying with Li and facilitating fast interfacial transport. Similar results have been obtained in the ex situ post-mortem SEM study on Sn—Li electrodes with different amount of deposits. Both in situ and ex situ studies clearly demonstrate that tin-protection is effective on achieving dendrite free deposition of lithium even at the high current density.

Figure 3B:
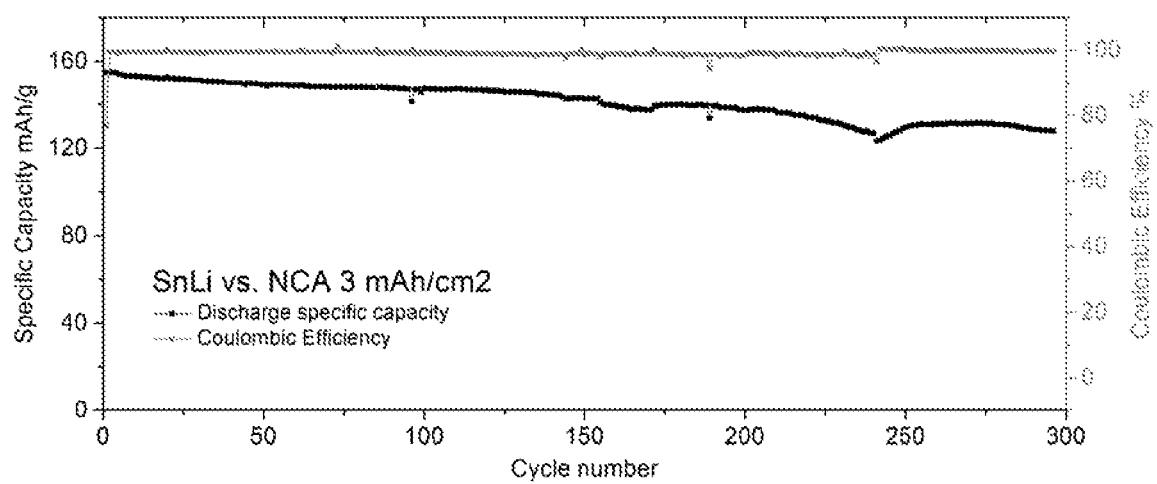
FIG. 3B shows cycling performance of a tin-protected lithium vs. NCA cell with 3 mAh cm$^{-2}$ areal capacity operated from 3 to 4.2 V at 0.5C. The inset shows the voltage profile of the 1$^{st}$, 100$^{th}$, and 200$^{th}$ cycle.
Figure 3C:
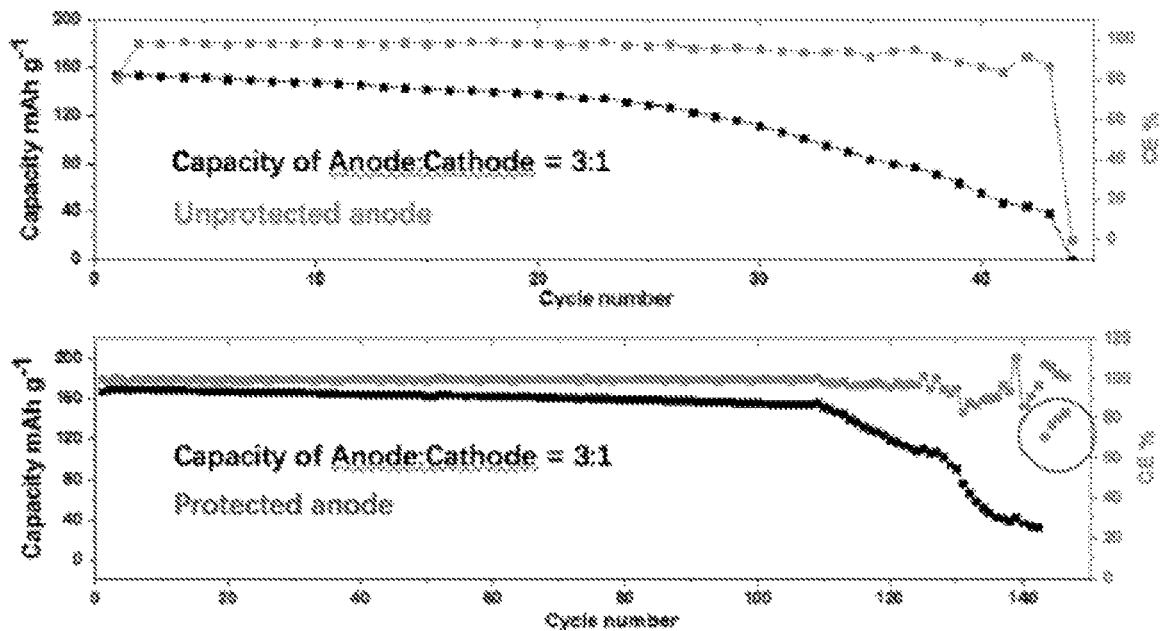
FIG. 3C Shows Capacity and efficiency profile of the tin-protected lithium vs. NCA cathode (3 mAh cm$^{-2}$) operated at 0.5C with anode to cathode capacity ratio of 3:1. The pre-determining amount of lithium was electrodeposited in 1M LiTFSI DOL:DME on a stainless' steel electrode, followed by cleaning with DOL and the tin-bearing electrolyte treatment. The points circled in the end represent the battery cycled at 0.1C, which shows a significant capacity recovery indicating the loss of capacity largely arises from the increased resistance.

The SEI formed on an electrode is understood to be dynamic, varying with time and in space. A requirement for interface stability is that artificial interphases must be able to survive extensive cycling. We show that the Sn—Li anode can be steadily operated in a symmetric cell configuration at a practical current density of 3 mA cm-2 and a capacity of 3 mAh cm-2 per cycle. No short circuit has been observed during a 500-hour period of continuous measurement, as opposed to the control which exhibits a permanent failure evidenced by the sudden voltage drop occurring at about 55 hours. The stability of the Sn—Li anode makes it a commercial candidate for new types of Li batteries that rely on a combination of plating and alloying processes for achieving stable, long-term operation. FIG. 3B shows that such cells can be operated in full cell configurations paired with state-of-the art intercalating cathodes (LiNiCoAlO (NCA)) with high loading (19.9 mg/cm2; 3 mAh cm$^{-2}$); the inset reports the voltage-capacity profile. A capacity retention >80% is observed over 300 cycles of operation at a rate of 0.5 C with Coulombic efficiency close to unity, i.e. approximately 100%. Similar stable battery operation has also been observed in cells equipped with LiCoO$_2$ cathodes, which demonstrates the broad compatibility of the Sn—Li hybrid anode configuration studied here. The potential application of the hybrid anodes in cells where the anode:cathode capacity ratio is fixed at 3:1 is illustrated in FIG. 3C. In contrast to the pristine lithium, which fails quickly within 30 cycles, Sn—Li‖NCA cells cycle stably for over 100 cycles as a result of alleviated lithium loss. Efforts to optimize the electrolyte composition for the Sn—Li anodes are underway and are expected to yield further improvements in cell performance.

Figure 4A:
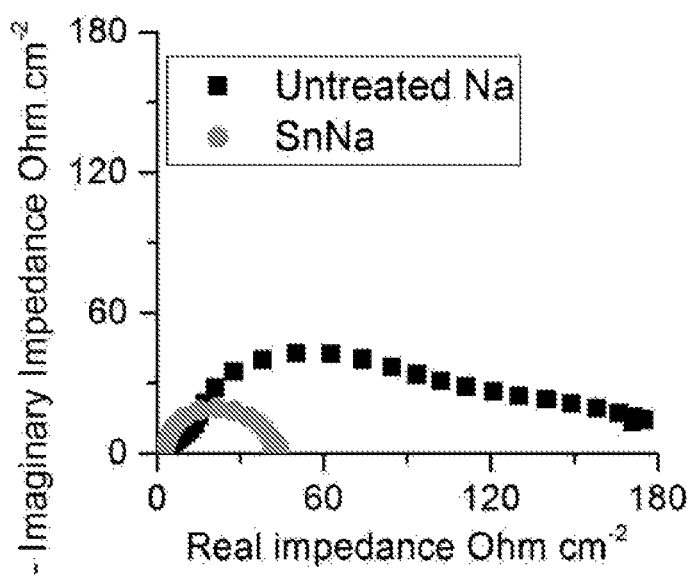
FIG. 4A shows impedance spectra of the tin-protected sodium symmetric cell and pristine sodium symmetric cell measured at room temperature and demonstrates that hybrid Sn—Na anodes offer a route to stable deposition at reactive sodium electrodes.
Figure 4B:
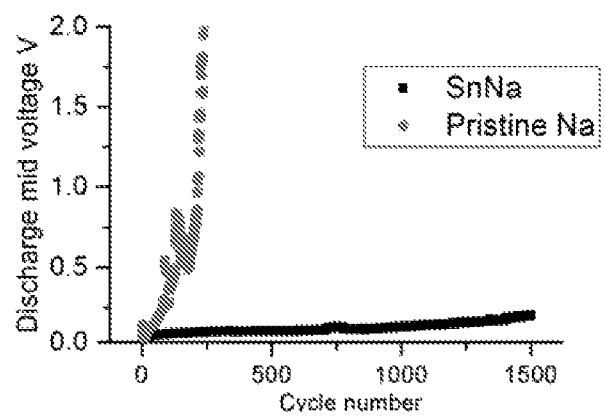
FIG. 4B shows average discharge voltage at different cycles for the tin-protected sodium and the pristine sodium from FIG. 4A.

The success of the Sn—Li hybrid electrodes can be applied to achieve stability of sodium anodes, notorious for their reactivity with carbonate electrolytes and propensity to form rough, dendritic deposits during battery recharge. To evaluate this, Sn—Na hybrid electrodes were prepared in a similar manner based on ion exchange with a Sn salt additive. FIG. 4A compares the impedance spectra measured at room temperature for the pristine symmetric sodium cell and symmetric Sn—Na cells, both in a 1M $NaPF_6$ EC:propylene carbonate (PC) based electrolyte. The interfacial resistance of the Sn—Na cells is evidently significantly reduced compared with the pristine case. In contrast to lithium, the Sn layer on sodium is mostly in the form of a sodium-rich alloy instead of the elemental metal as evidenced by XRD profile. This can be attributed to the high reactivity of the sodium. After cycling symmetric cells for 10 cycles at a current density of 0.5 mA $cm^{-2}$, both untreated and Sn—Na electrodes were harvested and observed using SEM. The untreated sodium forms irregular bumps covering the surface likely due to the non-uniform, fragile SEI formation because of the electrolyte decomposition. On the other hand, the surface of the Sn—Na electrode maintains a flat, uniform morphology. A protected electrode surface is particularly critical for long-term battery operation. As a proof-of-concept, the symmetric sodium cells were subjected to repeated charge/discharge cycles at moderate current densities of 0.25 and 0.5 mA cm-2. Sodium metal batteries typically fail quickly due to the resistive SEI formed by uncontrolled side reactions between sodium and the electrolyte, which manifests in a tell-tale voltage divergence at the end of life. In contrast the Sn—Na symmetric cells exhibit drastically improved voltage profiles over 1700 hours at 0.25 mA $cm^{-2}$ and 1000 hours at 0.5 mA $cm^{-2}$ of operation, with only slight increase of overpotential. Whereas the pristine sodium cell exhibits a quick voltage divergence to 1V after merely 250 hours even at the low current density, presented in FIG. 4B. These results evidently suggest that Sn protection of reactive metal anodes provides a versatile route towards hybrid anodes that take advantage of alloying and plating process for stable, high-energy electrochemical storage.

In summary, we report that hybrid anodes created by depositing Sn on the surface of reactive metals such as Li and Na via a facile ion-exchange reaction provides a mechanism for protecting the anode and at the same time facilitate fast charge transfer kinetics at the electrode. We find that Sn—Li and Sn—Na anodes exhibit vastly reduced interfacial impedance and much higher exchange current in liquid electrolytes, which is attributed to a hybrid ion storage mechanism including both metal electrodeposition and alloying. Sn—Li anodes are also reported by means of direct visualization studies in an optical microscope and ex-situ electron microscopy measurements to exhibit stable long-term galvanostatic cycling without forming dendrites. The excellent stability of Sn—Li is further demonstrated in studies utilizing the material as the anode for lithium metal batteries where it is paired with a high loading (19.9 mg $cm^{-2}$, 3 mAh $cm^{-2}$) NCA cathode. Motivated by these observations, we show that Sn—Na anodes exhibit an impressive ability to facilitate stable electrodeposition sodium, which is known to be intrinsically more reactive. Over 1600 hours of steady operation of symmetric protected sodium batteries can be achieved at moderate current densities with no signs of voltage divergence typically observed in Na cells.

The hybrid anodes according to this embodiment were prepared by a simple electroless ion-exchange reaction to form an indium coating on a metal electrode, e.g., a lithium metal electrode. This approach exploits the effects of the solvent (and electrolyte) at the interface. The key idea is to utilize strong interactions of the solvent with the electrodeposited atom to weaken its binding to the electrode surface and flatten the energy landscape for atom motion in the plane. Aprotic solvents used in battery electrolytes will interact most strongly with charged species. Stable charging of the surface atom should be possible under these conditions by employing a difference in electropositivity between the deposited atom and the electrode. We illustrate these ideas using indium metal coatings on lithium metal anodes formed by an in-situ electroless plating technique. The high electropositivity of lithium relative to indium is expected to result in (partially) positively charged lithium atoms on the In surface.

In order to evaluate the energetic landscapes at the electrode-electrolyte interphase, we perform density-functional theory calculations of lithium atom diffusion on the surface of indium, both in vacuum and in an electrolyte environment described using a previously established continuum solvation methodology. The two most stable surfaces of indium, (011) and (001), are very close in surface energy, so we examine lithium ion diffusion on both these surfaces. In vacuum, we find a large difference between the diffusion barriers on the two surfaces. The highest-density In(011) surface has a small diffusion barrier of 0.04 eV (less than 2 $k_BT$) between adjacent hollow sites, whereas the In(001) surface has a much larger barrier of 0.30 eV (~11 $k_BT$), also in a path connecting adjacent hollow sites over a bridge site.

We compared the predicted surface energies of the low-index surfaces of indium in vacuum as well as solution, with previous calculations for other metal electrodes. Importantly, the surface energies of indium are comparable to the other metals (larger than Na, but smaller than Li and Mg) and are not significantly affected by the solvent.

Figure 5:
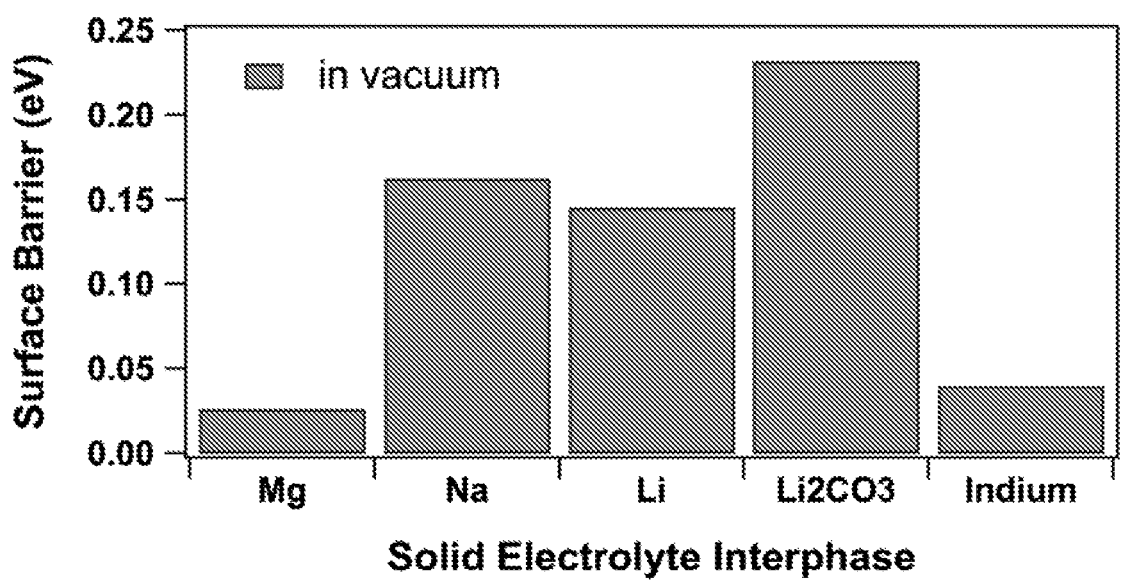
FIG. 5 is a plot comparing surface diffusion barrier of indium with other interphases reported before, including Mg, Na, Li, $Li_2CO_3$.

The solvent dramatically alters the energy landscape for Li diffusion on both these surfaces. For the (011) surface, the minimum energy path is qualitatively similar (connecting adjacent hollow sites), but the barrier reduces to 0.015 eV (<kT). For the (001) surface, the change is much more dramatic: the stable binding sites switch from the hollow to the top sites because the latter are more accessible by the solvent and hence stabilized further. The barrier drops to 0.013 eV (<kBT) for this surface as well. Lowdin charge analysis suggests a charge ranging from +0.3 to +0.5 for the Li atom on the solvated In surfaces; while the exact value of atomic charges is not particularly meaningful, this does agree with the qualitative picture of solvent stabilization in this case. In summary, our JDFT calculations reveal a dramatic reduction in the diffusion barriers for Li on solvated In surfaces due to solvent stabilization. For the two most stable surfaces of In, the barriers are less than $k_BT$~0.026 eV at room temperature, and smaller than those reported for other electrode or coating materials. Significantly, as seen from the bar chart in FIG. 5, the diffusion barrier is much lower than the commonly generated SEI component lithium carbonate, but is comparable to that of magnesium, which is known to electrodeposit at moderate currents in the diffusion-controlled regime, without dendrite formation.

Figure 6:
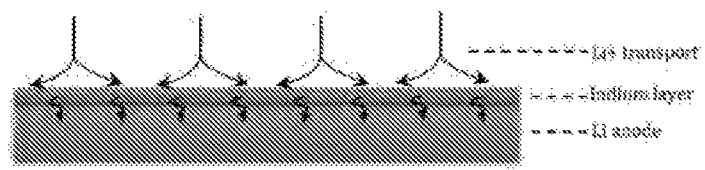
FIG. 6 is a schematic of a hybrid electrode, e.g., a hybrid indium protected lithium metal electrode, illustrating Li+ ion transport near the interface and through the indium layer to the lithium layer.

We choose to focus on indium for this embodiment because in addition to its low surface diffusion barrier In can spontaneously undergo alloying reactions with lithium. Commonly used intercalating materials like graphite, tin and silicon are also known to form carbonates and oxides by side reactions. Here, we utilize an indium metal coating, which is relatively inert and nonreactive with most electrolyte components. FIG. 6 shows the schematic of the proposed lithium metal protection technique using Indium metal. In this method, $In(TFSI)_3$ salt is used in the electrolyte as additive to form the electroless coating by reduction reaction given by: $3Li+In(TFSI)_3 \rightarrow 3LiTFSI+In$. The predicted field lines of Li ions indicate the enhanced surface diffusion, followed by alloying in the Indium buffer layer before electrodeposition. To demonstrate the electroless plating method, lithium metal anodes were dipped in a solution of 12 mM In(TFSI)$_3$ in EC:DMC (1:1) and allowed to incubate for 6 hours, followed by washing and drying under vacuum. The treated Li surface was characterized using scanning electron microscopy (SEM). The chemical composition was mapped using Energy Dispersive X-ray Spectroscopy (EDX). It was seen that Indium is evenly plated on the Li surface. Further, X-Ray Diffraction (XRD) was utilized to analyze the surface of Indium coated lithium metal as shown in FIG. 2d. The presence of In, In—Li alloy peaks in addition to Li XRD-peak confirm the Indium metal formation by the reaction of In(TFSI)$_3$ with lithium. We later show that it is possible to create a self-healing version of these coatings by adding as little as 12 mM In(TFSI)$_3$ as a co-salt in a standard battery electrolyte.

Further, X-ray Photon Spectroscopy (XPS) spectra were taken for the Li electrode after conditioning at a low current density of 0.1 mA cm' for 10 cycles in a symmetric cell with the elctrolyte 1M LiPF$_6$ EC/DMC+12 mM In(TFSI)$_3$. Analogous results were seen when the electrodes are cycled at 1 mA cm$^3$. The In 3d spectra shows two fully split peaks of 3d$_{3/2}$ and 3d$_{5/2}$ at 352 eV and 344 eV respectively for both before and after cycling at high current densities. The presence of metallic Indium peaks even after cycling indicate that the coating remains intact during the expansion and contraction of the Li electrode during charge and discharge, respectively. Typical peaks at 55 eV in Li 1s representing organometallic compounds are further seen. The C1s spectra peaks (284.8, 285.5, 286 and 288.5 eV), confirm the presence of ROCO$_2$Li and polycarbonates before and after cycling. An additional peak of 299.9 eV is seen in the C1s spectra, after the high current density cycling, indicative of additional formation of carbonates. The peaks at 533.5 and 531 eV in case of O1s spectra also confirm the presence of carbonates and ROCO$_2$Li species. In case of F1 spectra, 685 eV peak indicates LiF, while that at 688-689 eV represent organo-fluorides (C—F bond), with a shift in the energy for CF$_2$ and CF$_3$ as seen in the spectra before cycling. The LiF, here is predicted to be generated by the interaction between the anion species of TFSI$^{-1}$ and PF$_6^{-1}$. As LiF generation is often associated with degradation of PF$_6^{-1}$, its absence confirms the ability of Indium layer in preventing side reactions. Overall, it can be concluded that Indium metal forms a conformal coating on the Li anode along with other carbonate species. Further it is confirmed that the chemical composition of this coating is unperturbed even after long term cycling. The approach therefore provides a facile method for creating In—Li electrodes that take advantage of the electrochemical attributes of both metals.

Figure 7:
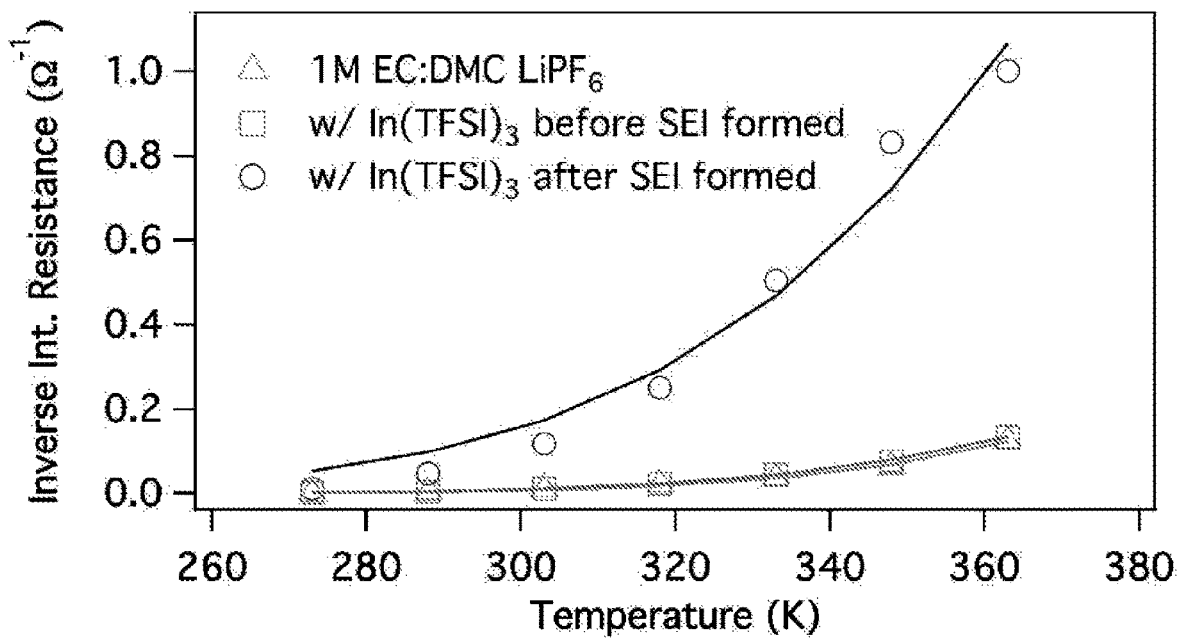
FIG. 7 is a plot of reciprocal of interfacial impedance obtained by circuit model fitting of impedance curves. The solid lines represent Arrhenius plot for interfacial impedances.

We performed impedance spectroscopy measurements for control electrolyte comprising of 1M LiPF$_6$ EC/DMC and electrolyte reinforced with 12 mM In(TFSI)$_3$. In Nyquist diagrams obtained at 30° C., the lines are fits obtained using the equivalent circuit. It is seen that the interfacial resistance of the cell using the control electrolyte is essentially unchanged relative to the one where which In(TFSI)$_3$ was introduced. However, after five cycles at a low current density (0.1 mA cm$_{-2}$), the interfacial resistance of the latter cells is seen to reduce significantly, by about 10 times. The high interfacial resistance initially observed is consistent with the blockage of direct electrolyte access to the Li electrode. The fact that the cell without initial conditioning has the same interfacial resistance as the control cell is also unsurprising because it is known that Li metal forms a native coating of oxides and carbonates even with slightest exposure of organic solvent and oxygen (even inside the glovebox). The low current density conditioning thus appears to have the effect of cleaning off the surface for in-situ reaction of fresh Li with Indium salts. The interfacial conductance or reciprocal of interfacial resistance is plotted in FIG. 7 for all three cases and fitted to the Arrhenius form, $R_{int-1}$=A exp(−B/T). Values of activation energy B, were tabulated. The results show that the interfacial activation energy for a Li anode in presence of Indium salts without conditioning (0.39 eV/atom) is similar to that of pristine Li (0.43 eV/atom) in the same baseline electrolyte. After generation of the Indium coating on the anode, however, the value drops to 0.29 eV/atom, which is a substantial decrease in comparison to kT. As previously reported, the lower interfacial activation energy reflects the reduced diffusion barrier for surface transport of Li ad atoms on the In surface.

Cyclic voltammetry analysis was undertaken in a two-electrode cell comprised of Li foil as reference as well as counter electrode and Indium metal (100 μm) as the working electrode, with 1M LiPF$_6$ EC/DMC as electrolyte. On backward scanning, a positive current peak of −4 mA/cm$_2$ appears at ~0.5V (vs. Li/Li+), indicative of lithium alloying in Indium metal; while on reverse scanning, a de-intercalation peak appears at ~1.2V (vs. Li/Li+). A similar experiment was conducted in a Li versus stainless steel cell using 12 mM In(TFSI)$_3$ salt additive. Current peaks at 0.5V and 1.2V (vs. Li/Li+) are also observed, however with lower magnitude. These peaks are associated with the Li alloying and de-alloying from the in-situ formed In layer on stainless steel. During battery operation, this layer is hypothesized to act as buffer passage for consequent plating on the underlying Li layer. Further, it is seen that the peak heights do not change significantly over 5 cycles, indicating good stability of the In layer during the charge-discharge processes. In comparison, on cycling the thick Indium electrode there is significant shift in the current peaks as well the appearance of noise. A simple calculation yields an estimate of the thickness of the in-situ formed In layer (1.25 μm), based on the measured capacity of the Indium foil (100 μm). This layer is evidently much thicker than spontaneously formed SEI coatings on reactive metals such as Li, which leads us to describe the resultant anodes as In—Li hybrid anodes because of their ability to utilize both reversible alloying and electroplating of Li ions for energy storage.

The morphology of Li deposits, with and without Indium coating was characterized using scanning electron microscopy (SEM) after plating a stainless steel electrode at 0.5 mA/cm$_2$ for 6 hours. It is seen that for the control electrolyte, Li deposition is rough and needle-like, while with Indium protection it is smooth and uniform. Since, the Li deposits with control electrolyte is more perforated, there is a higher degree of contact between the electrolyte and electrode resulting in a greater tendency for parasitic reaction with the electrolyte, also the lithium spikes can cause rupture in the SEI layer. The interconnected and flat deposits achieved with In protection testifies to the low energy barrier for Li-ion diffusion on the In surface, i.e. similar to previously observed Magnesium electrodeposition.

It is believed that the macroscopic morphological evolution during electrodeposition is dependent on the interfacial ion mobility and initial nucleation process. We performed direct visualization experiments in an optical microscope to monitor the electrodeposition on longer time scales. Specifically, an in-house built visualization setup was utilized comprised of a lithium rod as one electrode and a stainless disc as the counter-electrode, with electrolyte filled in the center tube. Using a current density of 8 mA cm$^{-2}$, morphological changes of the electrode were recorded at equal time intervals up to 15 mins (2 mAh cm$_{-2}$), as shown in FIG. 4a. For the control electrolyte (1M LiTFSI-PC), the morphology is uneven and rough compared to the smooth and compact Li deposits achieved with the In coating. Further, in comparison to the electrodeposition with In salt additives, the Li deposits with the PC based neat electrolyte are darker in color, this is an indication of instantaneous side reactions because of an unstable SEI. Quantitative comparison of the morphological changes was obtained by plotting the height of deposit at different times. Using a linear fit, the growth rate of pristine Li deposits were found to be ~90 nm/sec, while that of the In—Li hybrid electrode was found to be ~12 nm/sec. Thus, it is evident the Indium layer results in improved long term electrodeposition stability.

Figure 8A:
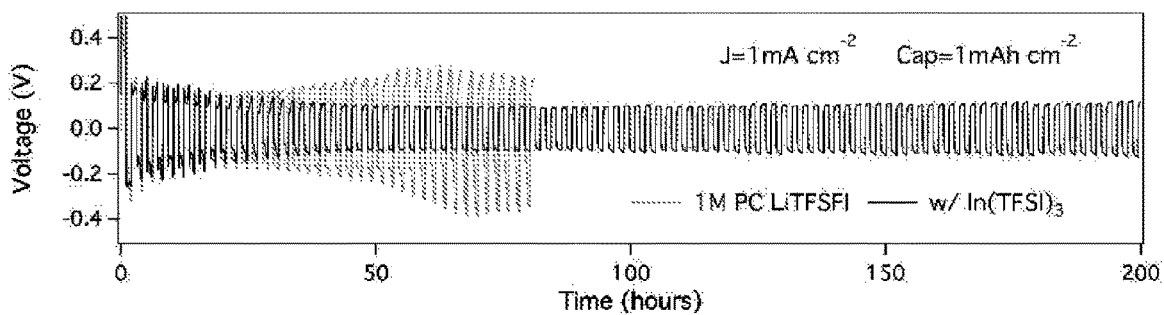
FIG. 8A shows a voltage profile for symmetric lithium cell at current density of 1 mA/cm$^2$ with each half-cycle is 1 hour. The red curve represents control cell with the electrolyte 1M LiTFSI in PC, while the black is with 12 mM $In(TFSI)_3$ added in the same electrolyte.
Figure 8B:
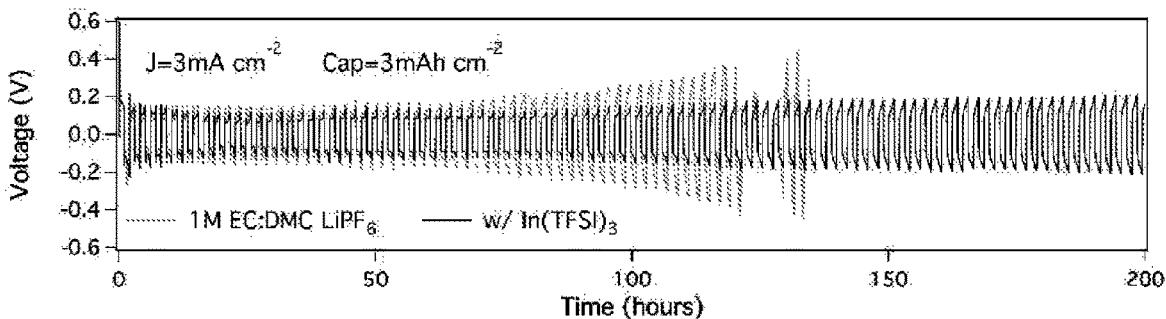
FIG. 8B shows a voltage profile of symmetric cells cycled at 3 mA/cm$^2$ with each half-cycle is 1 hour. Here the control electrolyte, shown in red, is 1M $LiPF_6$ EC:DMC and the black lines represent cell with the same electrolyte and 12 mM $In(TFSI)_3$ additive.

FIG. 8A shows the voltage profile from a galvanostatic charge-discharge experiment performed in a symmetric Li/Li cell. The cell was charged and discharged for 1 hour at a current density of 1 mA/cm$_2$. The control electrolyte is 1M LiTFSI in PC, while in the other case, 12 mM In(TFSI)$_3$ salt was added. Within approx. 30 cycles the overpotential of the control cell increases to over twice its initial value. This can be attributed to the formation of an insulating SEI by continuous reactions between Li and the electrolyte, which hinders ion transport at the interface. In contrast, cells based on the In—Li hybrid anodes cycle with lower overpotentials for over 200 hours. A similar experiment was performed using the base electrolyte comprised of commercial grade 1M LiPF$_6$ in EC:DMC (1:1 by vol.), and the cells were cycled at a current density of 1 mA/cm$^2$ for the same charge and discharge time of 1 hour (FIG. 8B). After 120 hours of cycling, there is a clear drop in the voltage, following a rise in overpotential, which is indicative of cell failure by internal short-circuit, In contrast, long-term stability is attained with Indium coating.

Figure 9:
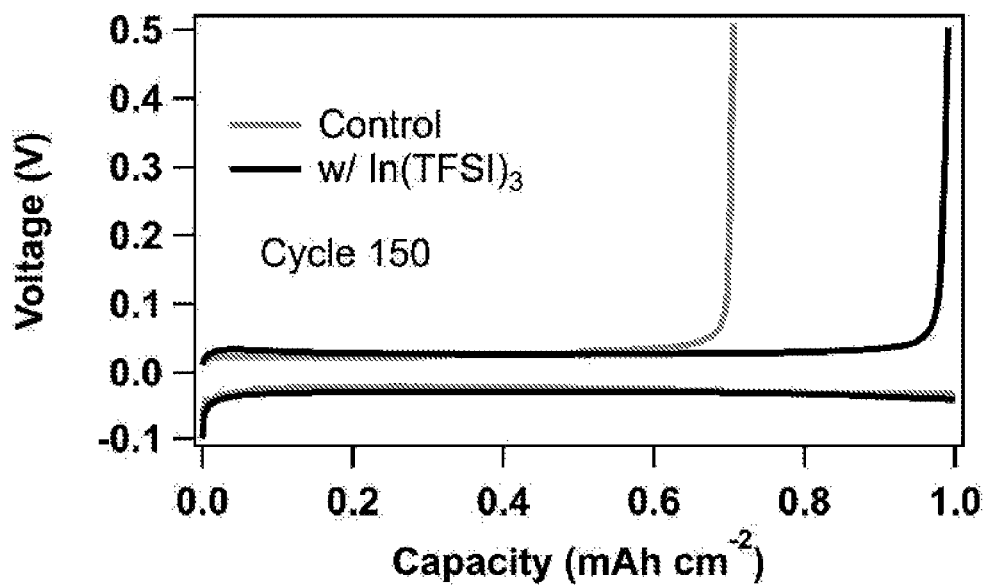
FIG. 9 shows the long-term galvanostatic cycling performance of voltage profile of Li‖stainless steel cells configuration at a current density of 1 mA/cm$^2$ and capacity of 1 mAh/cm$^2$ for the 150$^{th}$ cycle.
Figure 10:
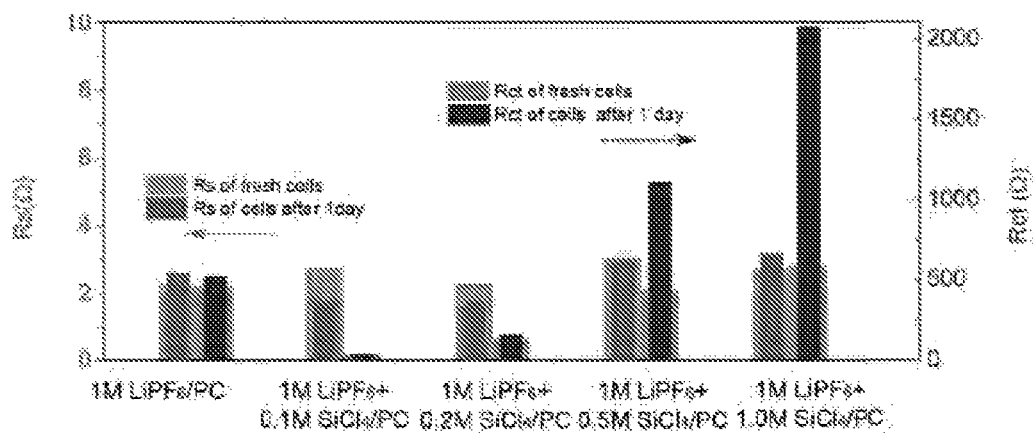
FIG. 10 shows the $R_s$ and $R_{ct}$ results of the addition of $SiCl_4$ to an electrolyte through fitting of an equivalent circuit.

The coulombic efficiency (CE) was characterized for cells comprised of Li and stainless steel electrodes. In this experiment, Li is deposited onto the stainless steel at a current density of 1 mA/cm$_2$ for 1 hour and then stripped at the same current density until the voltage rises to 0.5V; the CE is defined as ratio of stripping and plating time. The base electrolyte (control) used here is 1M LiPF$_6$ in EC:DMC with 10 vol % fluoroethylene carbonate (FEC), which is known to stabilize the electrode interphase by generating lithium fluoride. This base electrolyte was reinforced with 12 mM In(TFSI)$_3$ in the companion experiment. Results show that the initial CE for both electrolytes is >95%, however for the control cell the CE begins to fluctuate and reverts to <70% at higher cycle numbers (see FIG. 9), in contrast cells based on the In—Li hybrid electrodes maintain high CE values (>95%) for over 150 cycles. The fluctuations in the CE can be shown to arise from sporadic electrical connections of broken pieces of lithium from previous cycles (so called 'orphaned lithium') in the cell. The addition of In(TFSI)$_3$ is hypothesized to result in formation of an In layer not only on the Li anode, but also on the bare stainless steel electrode, thus preventing side reactions when fresh Li is deposited on either electrode. On this basis it is argued that the protection technique should be applicable for stabilizing lithium metal anodes in presence of reactive solvents like dimethylacetamide or dimethyl sulfoxide, which are commonly utilized in lithium-oxygen batteries.

The effectiveness of the protection mechanism was finally evaluated in Li∥LTO cells with a very high mass loading cathode (24 mg/cm$_2$ or 3 mAh/cm$_2$) at a rate of 1C. It is seen that the cell shows over 85% capacity retention and high coulombic efficiency for at least 250 cycles. Further, we utilized the Indium protection method with high voltage Nickel Manganese Cobalt Oxide (NCM) cathode using the same electrolyte (1M LiPF$_6$ EC:DMC (10% FEC, 12 mM In(TFSI)$_3$)). The cell was charged at a fixed rate of 0.5C and discharged at a 1C. Since, TFSI$^-$ anion is unstable at high voltages, a very long charge capacity is observed for the initial cycle. Similar to cells based on LTO cathodes, the coulombic efficiency of the cell remains high (>98%) for at least 250 cycles, while there is close to 95% capacity retention. We believe that the long cycle life of the hybrid In—Li anode (paired with a high voltage cathode) is an important development in comparison to recently reported protected anodes. Because such hybrid anodes utilize both Li alloying and plating chemistries for charge storage, they can be implemented as high-energy replacement electrodes for the graphitic carbon anode in current use in Li-ion batteries.

In conclusion, using JDFT calculations we show that Li ions are very loosely bound to the surface of an In coating, thus enabling faster surface transport to form more uniform Li electrodeposits. Experimentally, we demonstrated that In coatings can be formed by a simple electroless plating method on a lithium metal anode. Using a suite of characterization tools, including electron microscopy and x-ray spectroscopy, it is further shown that the In layer is uniform and stable even after battery cycling. The interfacial resistance of the resultant In—Li hybrid electrode is significantly lower than that of the pristine metal, allowing Li ions to alloy with In and diffuses along the surface to form uniform deposits on the Li electrode mass under In protection. As a result of the enhanced interfacial ion transport mechanism, electrodeposition at long time-scales was visually observed to be compact and uniform. Application of the In—Li hybrid anodes to full cells employing high-loading commercial cathodes (LTO and NCM) showed that the electrodes can be cycled stably for over 250 cycles with close to 90% capacity retention.

In another aspect of the present disclosure, a hybrid electrode is composed metal electrode having a silicon salt thereon. Silicon salts that are useful for practice in the present disclosure include silicon halide salts such as silicon chloride, silicon bromide, etc., phosphate silicon salts, imide salts, etc. In this aspect, we use a silicon halide salt, e.g., SiCl$_4$, as an additive to form a smart SEI. The SiCl$_4$ is added to the most common 1 M LiPF 6/PC electrolyte. The ester solvent of PC is much cheaper than ether based solvent such as DOL or DME, also much safer with higher boiling point and no toxicity. However, the PC is also known as the solvent without forming the desired SEI, which is uneven with large resistance. Here, we added SiCl 4 into the solvent with the following two points. One is the formation the LiCl on the surface of metal Li, which has been proved beneficial for stable Li deposition. The other point is that we want to utilize Si 4+ to form a cross-linking polymer SEI co-operated with metal Li and PC solvent. This elastic and even SEI will contribute the low contact resistance with metal Li and afford the fast Li-ion transport with stable deposition.

We have added different SiCl$_4$ (0.1 M, 0.2 M, 0.5 M, 1.0 M) into the electrolyte of 1M LiPF$_6$/PC. Firstly, symmetric Li batteries are assembled with different electrolyte. After staying for 1 day, the batteries are disassembled to characterize the change of Li anode. The PC solvent forms the uneven surface. As comparisons, the surface of lithium with 0.1 M SiCl$_4$ added electrolyte or 0.2 M SiCl$_4$ added electrolyte shows the even surface, meanwhile occupying porous structure. The section view demonstrates a thin film formed on metal Li. At the same time, the Cl and Si element are uniformly distributed on the surface of metal Li. After increasing the content of SiCl$_4$, some place of Lithium become very tight (0.5M SiCl$_4$) and finally crack using the electrolyte of 1.0M SiCl$_4$ in 1M LiPF6 in PC, and also a thick SEI can be investigated (about 20 μm).

The EIS tests of symmetric batteries are carried to investigate the resistance change after adding SiCl$_4$. For batteries with all the electrolytes, the $R_s$ are almost the same. However, a small amount addition of SiCl$_4$ (0.1M, 0.2M) has displayed magic effect on the charge transfer resistance ($R_{ct}$) of batteries, which are much smaller than pure LiPF$_6$/PC electrolyte. And higher SiCl$_4$ amount (0.5M, 1.0M) take the opposite effect with higher $R_{ct}$ The 1-V curves with the calculation of exchange current density (i 0) also demonstrate the similar conclusions. Small symmetric Li batteries are discharged and charged at current density of 1 mA/cm$^2$.

The batteries applying both electrolyte of 0.1 M and 0.2M SiCl$_4$ additives display narrower gap than that with 1 M LiPF$_6$/PC. And there is no obvious voltage drop at first discharge process. Moreover, the batteries with 0.2M SiCl$_4$ added electrolyte shows highly stable performance at a very large current density of 3 mA/cm$^2$ (net current is 3.83 mA).

We use sulfur cathode to test full batteries. The battery with SiCl$_4$ added electrolyte demonstrates much higher discharge capacity and narrower polarization. Meanwhile, the CV curves also show the well overlap of second and the third cycle, revealing the high stability after SiCl$_4$ addition. After 200 cycles at 1 C, the capacity with SiCl$_4$ added electrolyte is still over 800 mA h/g.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Tin-Based Protective Layer on Lithium and Sodium

Lithium metal foil was purchased from Alfa Aesar (99.9%) and stored in the sub-ppm Argon filled glovebox (Inert Inc.). Tin bis(trifluoromethanesulfonyl) imide (SnTFSI, Alfa Aesar) was dissolved in ethylene carbonate: dimethyl carbonate (EC:DMC, 1:1 v:v) with different concentrations and the resultant clear solution was used to pretreat lithium metal foil to form surface protection. 100 μL SnTFSI solution was dropped on the lithium surface and the reaction was allowed for 30 mins. Treated lithium metal appears dark gray on the surface and was dried in the glovebox antechamber before usage. Sodium cubes (Sigma-Aldrich) were stored in mineral oil and sliced with fresh inner exposed for the same surface treatment.

A Leo 1550 Keck Field Emission Scanning Electron Microscopy (FESEM) with a Bruker EDX detector and a FBI Strata 400 DualBeam Focused Ion Beam (FIB) fitted with a Quorum PP3010T Cryo-FIB/SEM Preparation System were used to characterize the surface morphology and cross section morphology of the tin-protected alkali metal. To avoid reaction of the lithium sample with O$_2$ and moisture in ambient air during cryo-FIB experiments, the samples were quickly plunged into a nitrogen slush immediately after treatment or harvesting from lithium cells. The samples were subsequently maintained −165° C. in the cryo-FIB to preserve their structure. After cooling, all samples investigated remained under liquid nitrogen or in vacuum for the duration of the experiment. The crystal structure of the tin-protected lithium/sodium was investigated using a Rigaku X-Ray diffractometer (XRD) from 20 to 80 degree (two theta). Tin protected sodium metal was wrapped in Kapton tape during the experiment to avoid oxidation in air. Tin protected lithium metal was measured directly to gain the best resolution, since the surface treatment significantly slows down the oxidation. X-ray photoelectron spectroscopy SSX-100 (XPS) was used to study the detailed chemistry information on the tin-protected lithium surface. To avoid surface contamination, a vacuum puck was used to transfer sample from the argon filled glovebox to the high vacuum XPS chamber without exposure to atmosphere.

Electrochemical studies were performed using CR2032 coin cells with symmetric and asymmetric design. Symmetric lithium cells were assembled with two tin treated lithium metal anodes (SnLi/SnLi), Celgard 3501 polypropylene separator, and electrolyte containing 1 M LiPF$_6$ in EC:DMC (1:1) with 10 v % fluorinated ethylene carbonate (FEC) and 1 v % vinylene carbonate (VC). For cyclic voltammetry measurement, symmetric lithium cells with pristine lithium and tin treated lithium (Li/SnLi) were used. Symmetric sodium cells were assembled with two tin treated sodium metal anodes (SnNa/SnNa), Celgard 3501 polypropylene separator, and electrolyte containing 1 M NaPF$_6$ in EC:propylene carbonate (PC) (1:1 v %). Asymmetric lithium cells composed of tin treated lithium metal anode and lithium nickel cobalt aluminum oxide (NCA) cathodes (SnLi/NCA) provided by CAMP facility at Argonne National Labs with 90% active material loading and area capacity of 3 mAh cm-2. A piece of glass fiber was added in the full cell to absorb more electrolyte (200 μL).

Temperature-dependent ionic conductivity and impedance spectra were measured from 107 Hz to 10-1 Hz at a temperature range of −5 to 100° C. using Novocontrol dielectric/impedance spectrometer coupled with the temperature-controlling chamber. Cyclic voltammetry (CV) was performed on a CH 600E potentiostat with lithium being the pseudo-reference electrode at a sweep rate of 1 mV s-1. Galvanostatic plating/stripping of symmetric cells was studied on Neware battery testers at room temperature. SnLi/NCA full cells were cycled using a constant current-constant voltage charge and constant current discharge from 3 to 4.2 V.

In situ observation cell was home-made. Two lithium cylinder rods with a diameter of half inch were used as the electrodes connected with stainless steel transmission lines to the battery test channels. The snapshots were taken using an Olympus camera and microscope with 100× magnification. Images analysis was performed using the ImageJ software.

While the claimed invention has been described in detail and with reference to specific embodiments thereof, it will be apparent to one of ordinary skill in the art that various changes and modifications can be made to the claimed invention without departing from the spirit and scope thereof. Thus, for example, those skilled in the art will recognize, or be able to ascertain, using no more than routine experimentation, numerous equivalents to the specific substances and procedures described herein. Such equivalents are considered to be within the scope of this invention, and are covered by the following claims.

What is claimed is:

1. A rechargeable battery comprising:
   a liquid electrolyte comprising a solvent and a metal salt comprising a halide, a phosphate, or a bis(trifluoromethanesulfonyl) imide (TFSI) salt of Sn, In, Si, Al, Mg, or Ge; and
   a hybrid electrode, wherein the hybrid electrode includes an electrochemically active protective layer configured to be (a) electrochemically active and (b) disposed directly on an electrochemically active metal electrode, wherein the electrochemically active protective layer comprises a metal or a metalloid, wherein the metal or the metalloid comprises Sn or In, wherein the protective layer is further configured to reversibly accommodate ions in an intercalation formation, an alloy formation, or both.

2. The rechargeable battery of claim 1, wherein the metal electrode comprises substantially metallic lithium, metallic sodium, metallic aluminum, metallic zinc, metallic silicon, or metallic tin.

3. The rechargeable battery of claim 1, wherein the protective layer has a thickness in the range of about 5 nm to about 500 microns.

4. The rechargeable battery of claim 1, wherein the hybrid electrode is an anode of the battery and the battery further comprises a cathode.

5. The rechargeable battery of claim 1, wherein at least a portion of the protective layer comprises the metal salt.

6. The rechargeable battery of claim 1, wherein the protective layer comprises In, the metal salt comprises an indium salt, and the metal electrode is selected from lithium or sodium metal.

7. The rechargeable battery of claim 1, wherein the protective layer is Sn and the electrochemically active metal electrode is a sodium metal electrode.

8. The rechargeable battery of claim 1, wherein the metal electrode comprises sodium, and most of the protective layer is in the form of a sodium-rich alloy.

9. The rechargeable battery of claim 1, wherein the protective layer has a thickness in a range from about 5 nm to about 1 micron.

10. The rechargeable battery of claim 1, wherein the protective layer directly contacts the liquid electrolyte.

11. The rechargeable battery of claim 1, wherein the metal of the protective layer is capable of reversibly alloying with the electrochemically active metal and the hybrid electrode is configured to have both alloying and plating reactions at the hybrid electrode during battery operation to provide a compliant interphase to accommodate volume changes associated with both the alloying and plating reactions at the electrode.

12. The rechargeable battery of claim 1, wherein the metal salt is in an amount of between about 10 mM to about 100 mM in the liquid electrolyte.

13. The rechargeable battery of claim 1, wherein the solvent comprises an aprotic solvent.

14. The rechargeable battery of claim 1, wherein the liquid electrolyte comprises a tin or indium metal salt at about 1 mM to about 10 mM and the protective layer comprises tin or indium in a form of an alloy with lithium or sodium.

15. The rechargeable battery of claim 1, wherein the liquid electrolyte comprises a silicon salt at a concentration of less than 1.0 M.

16. The rechargeable battery of claim 1, wherein the liquid electrolyte further comprises a lithium salt or a sodium salt.

17. The rechargeable battery of claim 1, wherein the hybrid electrode has a surface diffusion barrier of less than $2\ k_B T$.

18. The rechargeable battery of claim 1, wherein the protective layer comprises In having an indium (011) surface configured to have a surface diffusion barrier of less than $2\ k_B T$.

19. A rechargeable battery comprising:
a liquid electrolyte comprising a solvent and a metal salt; and
a hybrid electrode,
wherein the hybrid electrode includes an electrochemically active protective layer configured to be electrochemically active and disposed directly on an electrochemically active metal electrode,
wherein the electrochemically active protective layer consists of Sn, In, Si, Al, Mg, or Ge, and
wherein the electrochemically active protective layer is further configured to reversibly accommodate ions in an intercalation formation, an alloy formation, or both.

20. A rechargeable battery comprising:
a liquid electrolyte comprising a solvent, a first metal salt, and a second metal salt comprising a halide, a phosphate, or a bis(trifluoromethanesulfonyl) imide (TFSI) salt of Sn, In, Si, Al, Mg, or Ge; and
a hybrid electrode,
wherein the hybrid electrode includes an electrochemically active protective layer configured to be electrochemically active and disposed directly on an electrochemically active metal electrode comprising substantially metallic lithium or metallic sodium,
wherein the electrochemically active protective layer comprises a metal or a metalloid selected among Sn or In, and wherein the electrochemically active protective layer is further configured to reversibly accommodate ions in an intercalation formation, and
wherein the hybrid electrode is further configured to have a surface diffusion barrier of less than $2\ k_B T$.

* * * * *